United States Patent
Zhang et al.

(10) Patent No.: US 12,323,978 B2
(45) Date of Patent: Jun. 3, 2025

(54) METHODS AND APPARATUS FOR SENDING AND RECEIVING SECOND STAGE SCI, STORAGE MEDIUM, SENDING UE, AND RECEIVING UE

(71) Applicant: SPREADTRUM COMMUNICATIONS (SHANGHAI) CO., LTD., Shanghai (CN)

(72) Inventors: Meng Zhang, Shanghai (CN); Xin Qu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 443 days.

(21) Appl. No.: 17/765,243

(22) PCT Filed: Aug. 14, 2020

(86) PCT No.: PCT/CN2020/109121
§ 371 (c)(1),
(2) Date: Mar. 30, 2022

(87) PCT Pub. No.: WO2021/063116
PCT Pub. Date: Apr. 8, 2021

(65) Prior Publication Data
US 2022/0312401 A1    Sep. 29, 2022

(30) Foreign Application Priority Data
Sep. 30, 2019  (CN) .......................... 201910941108.3

(51) Int. Cl.
*H04W 72/20*    (2023.01)
*H04L 5/00*     (2006.01)

(52) U.S. Cl.
CPC ........... *H04W 72/20* (2023.01); *H04L 5/0048* (2013.01)

(58) Field of Classification Search
CPC .... H04L 5/0048; H04L 67/104; H04W 72/20; H04W 4/40; H04W 72/25; H04W 72/40; H04W 28/0867
See application file for complete search history.

(56) References Cited

U.S. PATENT DOCUMENTS

| | | |
|---|---|---|
| 2015/0085715 A1 | 3/2015 | Sun et al. |
| 2016/0112172 A1 | 4/2016 | Seo et al. |

(Continued)

FOREIGN PATENT DOCUMENTS

| | | |
|---|---|---|
| CN | 103096479 A | 5/2013 |
| CN | 103248469 A | 8/2013 |

(Continued)

OTHER PUBLICATIONS

International Search Report for International Application No. PCT/CN2020/109121; Date of Mailing, Nov. 18, 2020.

(Continued)

*Primary Examiner* — Shukri Taha
(74) *Attorney, Agent, or Firm* — CANTOR COLBURN LLP

(57) ABSTRACT

Methods and apparatus for sending and receiving second stage SCI, a storage medium, a sending UE, and a receiving UE are provided. The method includes: determining position information of a time-frequency resource used for sending the second stage SCI; configuring the second stage SCI based on the position information; and sending the second stage SCI.

4 Claims, 11 Drawing Sheets

(56) References Cited

U.S. PATENT DOCUMENTS

| | | | |
|---|---|---|---|
| 2019/0239264 A1 | 8/2019 | Hahn | |
| 2020/0244329 A1 | 7/2020 | Xiao et al. | |
| 2020/0274655 A1 | 8/2020 | Zhao | |
| 2020/0404624 A1* | 12/2020 | Roth | H04L 5/0044 |
| 2021/0067290 A1* | 3/2021 | Chen | H04L 5/0033 |
| 2022/0052822 A1* | 2/2022 | Lin | H04L 5/0094 |
| 2022/0140964 A1 | 5/2022 | Chen et al. | |
| 2022/0174649 A1* | 6/2022 | Ashraf | H04W 4/70 |
| 2022/0272727 A1* | 8/2022 | Salim | H04L 5/0051 |

FOREIGN PATENT DOCUMENTS

| | | |
|---|---|---|
| CN | 103327628 A | 9/2013 |
| CN | 105340198 A | 2/2016 |
| CN | 106612561 A | 5/2017 |
| CN | 108111199 A | 6/2018 |
| CN | 108401481 A | 8/2018 |
| CN | 109586868 A | 4/2019 |
| CN | 109586869 A | 4/2019 |
| CN | 110505703 A | 11/2019 |
| JP | 2019134422 A | 8/2019 |
| WO | 2020169024 A1 | 8/2020 |

OTHER PUBLICATIONS

LG Electronics, "Discussion on physical layer structure for NR sidelink", 3GPP TSG RAN WG1 #97, R1-1907012; May 13-17, 2019; 25 pages.

Spreadtrum Communications, "Discussion on physical layer structure for sidelink", 3GPP TSG RAN WG1 #98, R1-1908947, Aug. 26-30, 2019; 15 pages.

Spreadtrum Communications, "Discussion on physical layer structure for sidelink", 3GPP TSG RAN WG1 #98bis, R1-1910005, Oct. 14-20, 2019; 14 pages.

EPO Extended European Search Report for corresponding EP Application No. 20872294.2; Dated on Nov. 18, 2022.

Futurewei, "Two-stage SCI design and adaptive DMRS support for sidelink", 3GPP TSG RAN WG1 Meeting #98, R1-1908737, Aug. 26-30, 2019, 6 pages.

Intel Corporation, "Sidelink Physical Structure for NR V2X Communication", 3GPP TSG RAN WG1 Meeting #97, R1-1906794, May 13-17, 2019, 20 pages.

Sony, "Discussion on physical layer structure for NR sidelink", 3GPP TSG RAN WG1 #98, R1-1908770, Aug. 26-30, 2019, 4 pages.

JPO Notice of Reasons for Refusal for corresponding JP Application No. 2022-520029; Date of Mailing, May 19, 2023.

Intel Corporation "Physical Structure for NR V2X"; 3GPP TSG RAN WG1 Meeting #98, R1-1908633; Prague, CZ, Aug. 26-30, 2019; 24 pages.

KR Office Action for corresponding KR Application No. 10-2022-7014638; Issued Nov. 18, 2024.

Qualcomm Incorporated "Considerations on Physical Layer aspects of NR V2X"; 3GPP TSG RAN WG1 Meeting #98, R1-1909252; Prague, CZ, Aug. 26-30, 2019; 17 pages.

Xiaomi, "Discussion on physical layer structure for 5G V2X"; 3GPP TSG RAN WG1 #98, R1-1909290; Prague, CZ, Aug. 26-30, 2019; 5 pages.

* cited by examiner

METHODS AND APPARATUS FOR SENDING AND RECEIVING SECOND STAGE SCI, STORAGE MEDIUM, SENDING UE, AND RECEIVING UE

CROSS-REFERENCE TO RELATED APPLICATIONS

This is the U.S. national stage of application No. PCT/CN2020/109121, filed on Aug. 14, 2020. Priority under 35 U.S.C. § 119(a) and 35 U.S.C. § 365(b) is claimed from Chinese Application No. 201910941108.3, filed Sep. 30, 2019, and entitled "METHODS AND APPARATUS FOR SENDING AND RECEIVING SECOND STAGE SCI, STORAGE MEDIUM, SENDING UE, AND RECEIVING UE", the disclosure of which is also incorporated herein by reference.

TECHNICAL FIELD

The present disclosure generally relates to communication technology field, and more particularly, to a method and device for sending and receiving second stage Sidelink Control Information (SCI), a storage medium, a sending User Equipment (UE), and a receiving UE.

BACKGROUND

In the 3GPP standard, a direct communication link between devices is called a Sidelink. Similar to an uplink and downlink, there exists also control channels and data channels on the Sidelink, the former is called a Physical Sidelink Control CHannel (PSSCH), and the latter is called a Physical Sidelink Shared CHannel (PSCCH). The PSCCH is used for indicating a time-frequency domain resource position, a modulation and coding method, a priority of data carried in the PSSCH, etc. The PSSCH is used for carrying data.

In Vehicle to Vehicle/Pedestrian/Infrastructure/Network (V2X), the control information and data can be transmitted through the Sidelink, and a transmission resource can be selected according to Sidelink control information (SCI).

In the existing NR V2X, a two-stage SCI scheduling is a hot topic under discussion. However, few rule is available for a method for sending and receiving second stage SCI. Wherein, the scheduling information of the PSSCH may be stored in the first stage SCI in the two-stage SCI scheduling and/or the second stage SCI in the two-stage SCI scheduling. The first stage SCI can carry indication information of frequency domain resource of the PSSCH, MCS indication information, QoS indication information, etc. The second stage SCI can carry indication information of time domain resource of the PSSCH, indication information of a CSI request, etc.

SUMMARY

Embodiments of the present disclosure provide a method for sending and receiving second stage Sidelink Control Information (SCI), a storage medium, a sending User Equipment (UE), and a receiving UE, which can realize to send and receive the second stage SCI between the sending UE and the receiving UE.

In an embodiment of the present disclosure, a method for sending second stage SCI is provided, the method includes: determining position information of a time-frequency resource used for sending the second stage SCI; configuring the second stage SCI based on the position information; and sending the second stage SCI.

In an embodiment of the present disclosure, a method for receiving second stage SCI is provided, the method includes: receiving the second stage SCI; determining position information of a time-frequency resource of the second stage SCI; and decoding the second stage SCI based on the position information.

In an embodiment of the present disclosure, a device for sending second stage SCI is provided, the device includes: a first position determining circuitry, adapted to determine position information of a time-frequency resource used for sending the second stage SCI; a configuration circuitry, adapted to configure the second stage SCI based on the position information; and a sending circuitry, adapted to send the second stage SCI.

DETAILED DESCRIPTION

As mentioned in the background, in the V2X, the control information and data can be transmitted through the Sidelink, and a transmission resource can be selected according to SCI. Therefore, there is a need for a method for sending and receiving second stage SCI.

According to an embodiment of the present disclosure, the position information of the time-frequency resource used for sending the second stage SCI is determined firstly, then the second stage SCI is configured. In doing so, the transmission and reception of the second stage SCI between the sending UE and the receiving UE can be realized.

In order to clarify the object, characteristic and advantages of embodiments of the present disclosure, the embodiments of present disclosure will be described clearly in detail in conjunction with accompanying drawings.

Figure 1:
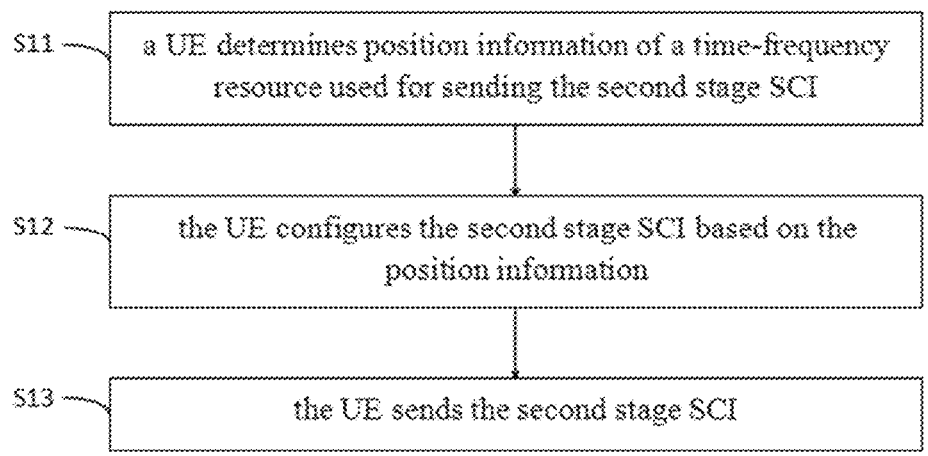
FIG. 1 schematically illustrates a flowchart of a method for sending second stage SCI according to an embodiment of the present disclosure.

Referring to FIG. 1, FIG. 1 schematically illustrates a flowchart of a method for sending second stage SCI according to an embodiment of the present disclosure. The method for processing a resource conflict may include S11, S12 and S13.

In S11, a UE determines position information of a time-frequency resource used for sending the second stage SCI In S12, the UE configures the second stage SCI based on the position information.

In S13, the UE sends the second stage SCI.

In a specific implementation of S11, the second stage SCI should be mapped around a Demodulation reference signal (DMRS) of the PSSCH as much as possible, which is conducive to improving the performance of the second stage SCI. Wherein, the second stage SCI may be mapped in the time-frequency resource range where the PSSCH is located.

Further, the position information may include a starting position of the time-frequency resource used for sending the second stage SCI. The UE configures the second stage SCI based on the position information, including: configuring the second stage SCI based on the starting position.

Specifically, the UE may configure the RE of the starting position of the second stage SCI to be adjacent to the RE of a DMRS symbol of the PSSCH scheduled by the second stage SCI and to be in an OFDM symbol same as that of the RE of a DMRS symbol of the PSSCH scheduled by the second stage SCI, or, configure the RE of the starting position of the second stage SCI to be adjacent to the RE of the DMRS symbol of the PSSCH scheduled by the second stage SCI and to be in a subcarrier same as that of the RE of the DMRS symbol of the PSSCH scheduled by the second stage SCI. Wherein, the RE of the starting position represents a first mapped RE when the second stage SCI is mapped to the time-frequency resource.

According to the embodiment of the present disclosure, by configuring REs in the adjacent relationship, the second stage SCI can be mapped around the DMRS of the PSSCH. Therefore, the channel estimation accuracy of the second stage SCI can be improved, which is conducive to improving the decoding accuracy and reducing the bit error rate. According to the embodiment of the present disclosure, the position information may include all time-frequency resources used for sending the second stage SCI. The UE configures the second stage SCI based on the position information, including: determining an initial position from the all time-frequency resources used for sending the second stage SCI: and configuring the second stage SCI based on the initial position.

Specifically, the all time-frequency resources may include, for example, time-frequency resource blocks configured in advance. For example, if the SCI to be configured includes 65 REs, all time-frequency resources of 100 REs are configured in advance.

Wherein, among the all time-frequency resources, the manner of configuring the SCI by the initial position may be consistent with the manner of configuring the SCI by the starting position according to the embodiment of the present disclosure.

Further, the time-frequency resource may be indicated by a high layer signaling (such as a RRC signaling).

According to the embodiment of the present disclosure, a supplementary bit, such as "0", may be configured in all time-frequency resources for filling REs other than the second stage SCI.

Wherein, a position of the supplementary bit should not be limited, which may be at the starting position of all the time-frequency resources, or at the middle position, or at the ending position.

Further, the initial position may be located at the starting position of the all time-frequency resources, or may be located in the middle position following the supplementary bit.

Figure 2:
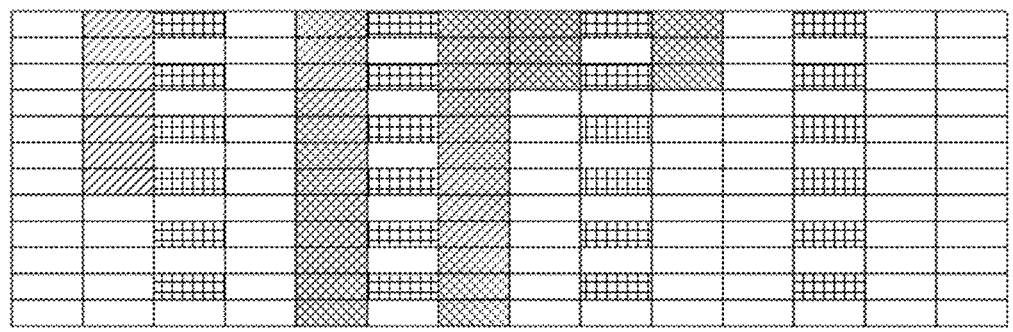
FIG. 2 schematically illustrates a diagram of a position configuration of second stage SCI according to an embodiment of the present disclosure.

Referring to the FIG. 2, FIG. 2 schematically illustrates a diagram of a position configuration of second stage SCI according to an embodiment of the present disclosure.

It should be noted that, in FIG. 2, a Demodulation reference signal configuration type 1 (DMRS configuration type 1) is taken as an example for illustration, and a DMRS configuration type 2 can be obtained in the same way, which is not repeated here. Wherein, a second stage SCI symbol refers to a symbol after the second stage SCI information is encoded and modulated, which may be a BPSK symbol, a QPSK symbol, a 16QAM symbol or other modulation symbols.

Wherein, in the DMRS configuration type1, an antenna port 0/1 is mapped to a Resource Element (RE), and an antenna port 2/3 is mapped to a RE. Assuming that a UE allocates the antenna port 2/3 for transmission. In this case, the antenna port 0/1 can be used for transmitting the second stage SCI, or not be used for transmitting the second stage SCI (it can also be identified whether the REs of the antenna port 0/1 can be transmitted by the PSSCH). It should be pointed out that the embodiment of the present disclosure is also applicable to cases of other antenna ports. For example, the DMRS may allocate antenna ports 0, 1, 2, 3, 0/1, 0/2, 0/3, 1/2, 1/3, etc., which is not repeated here.

It should be pointed out that in FIG. 2, only one Resource Board (RB) is taken for example of the frequency domain of the PSSCH, and it can be inferred that the frequency domain of the PSSCH may be other RBs, which is not be repeated here.

As shown in FIG. 2, the second stage SCI may be mapped on both sides of the DMRS or on a Symbol where the DMRS is located. Wherein, the Symbol may be a CP-OFDM symbol, an SC-FDMA symbol, a DFT-s-OFDM symbol, an OFDM symbol.

As for a sequence of mapping, it may be mapped around a DMRS symbol firstly, and then another DMRS symbol. For example, it may be one or two symbols which are adjacent to the DMRS symbol, or a time-frequency resource on the DMRS symbol which is not used for transmitting the DMRS yet. Wherein, the DMRS symbol may refer to a CP-OFDM symbol, an SC-FDMA symbol, a DFT-s-OFDM symbol, an OFDM symbol containing DMRS.

Further, if the REs around a DMRS symbol are not enough to contain all second stage SCI, the rest of the second stage SCI may also be mapped to the next DMRS symbol in sequence.

It should be understood that, if the sidelink does not have a Multi-User (MU) transmission operation, the REs which are not used by the symbol where the DMRS is located can also be used for transmitting the second stage SCI in principle. On the contrary, if the MU operation is supported, the SCI can be used for indicating whether there is a second stage SCI transmission on a specific DMRS symbol.

As an example, a base station may indicate through a higher layer signaling or DCI whether the REs which are not used for transmitting the DMRS on the symbol where the DMRS is located can be used for transmitting the second stage SCI, used for transmitting the PSSCH, or used for transmitting both the PSSCH and the second stage SCI. As another example, a sidelink sending UE may indicate through a higher layer signaling or DCI whether the REs which are not used for transmitting the DMRS on the symbol where the DMRS is located can be used for transmitting the second stage SCI, used for transmitting the PSSCH, or used for transmitting both the PSSCH and the second stage SCI.

As another example, as long as there is a RE not yet used for transmitting the DMRS on the symbol where the DMRS is located, the RE can be used for transmitting the second stage SCI and/or the PSSCH.

Continuing to refer to FIG. 1, in the specific implementation of S12, according to the starting position, the configuration of the second stage SCI according to the starting position may be implemented in various configuration ways.

Figure 3:
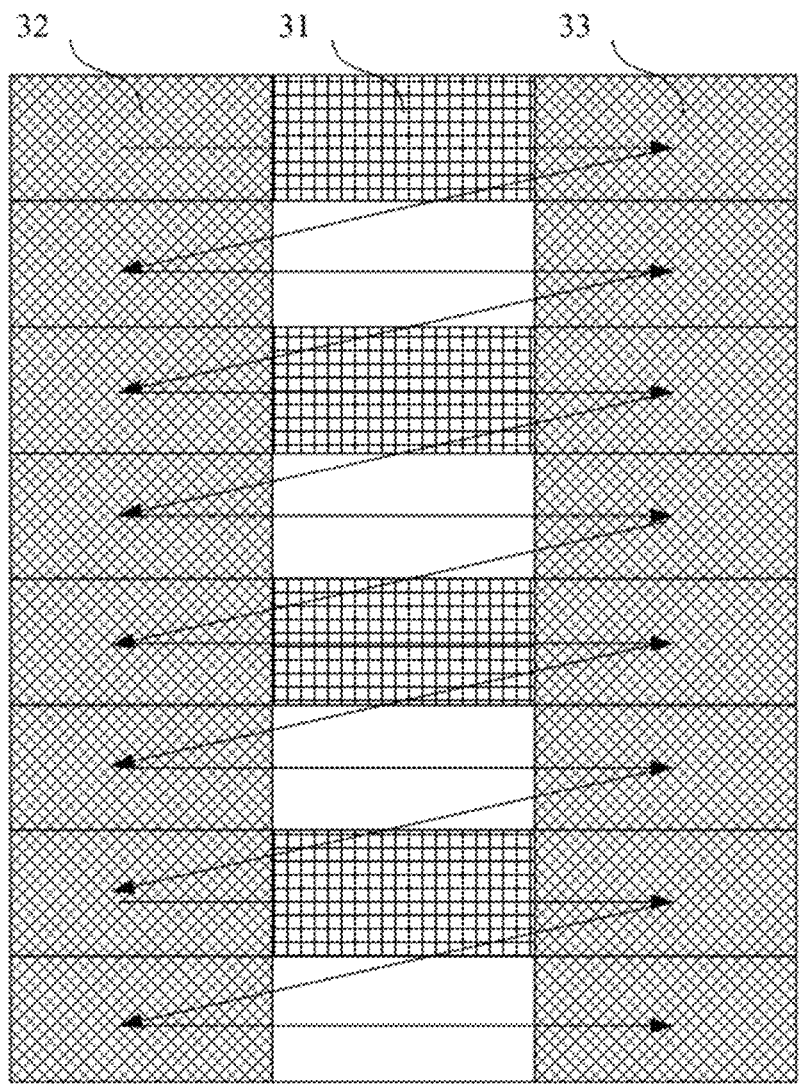
FIG. 3 schematically illustrates a diagram of a first position configuration sequence of the second stage SCI in FIG. 2.

Referring to the FIG. 3, FIG. 3 schematically illustrates a diagram of a first position configuration sequence of the second stage SCI in FIG. 2.

Specifically, the UE configures the second stage SCI based on the starting position, including: determining RE 31 of the DMRS symbol which is adjacent to the starting position of the second stage SCI; configuring a first second stage SCI symbol on the RE 32 of the starting position of the second stage SCI; on a subcarrier same as that of the first second stage SCI symbol, determining another RE 33 which is adjacent to the RE of the DMRS symbol and has a subcarrier same as that of the RE of the DMRS symbol to configure a second stage SCI symbol; and configuring two second stage SCI symbols sequentially on the two REs which are adjacent to the REs of the DMRS symbol according to an ascending or descending order of subcarriers of the DMRS symbol.

It should be pointed out that, in FIG. 3, the second stage SCI symbol RE 32 is configured at the left side of the time domain of the RE 31, and RE 33 is configured at the right side of the time domain of RE 31. However, in a specific implementation, the second stage SCI symbol may also be configured at the right side of the time domain of RE 31. That is, it is determined based on the order of the symbols from large to small. The embodiment of the present disclosure does not limit the sequence.

It should be pointed out that the RE 31 may be an RE with a largest or smallest subcarrier sequence number on the DMRS symbol, or the RE 31 may be an RE with a largest or smallest subcarrier sequence number in an overlapping range between the DMRS and the time-frequency resource region of the second stage SCI, or the RE 31 may be a DMRS symbol corresponding to a subcarrier sequence number indicated through SCI or a higher layer signaling.

It can be seen from FIG. 3 that, as shown by the arrows, the second stage SCI symbols can be sequentially configured in each horizontal direction (time domain) until the configuration of the second stage SCI symbol is completed, or until the current two columns are filled, the remaining second stage SCI symbols may be mapped onto subsequent DMRS symbols until the configuration of the second stage SCI symbol is completed. In the embodiment of the present disclosure, by mapping the second stage SCI around the DMRS of the PSSCH, the channel estimation accuracy of the second stage SCI can be improved, which is conducive to improving the decoding accuracy and reducing the bit error rate.

It should be pointed out that if there are spaced subcarriers among a plurality of subcarriers of the RE of the DMRS symbol, according to the embodiment of the present disclosure, two second stage SCI symbols may be sequentially configured on two REs which are adjacent to the RE of the DMRS symbol, that is, no second stage SCI symbol is configured on the spaced subcarrier.

Figure 4:
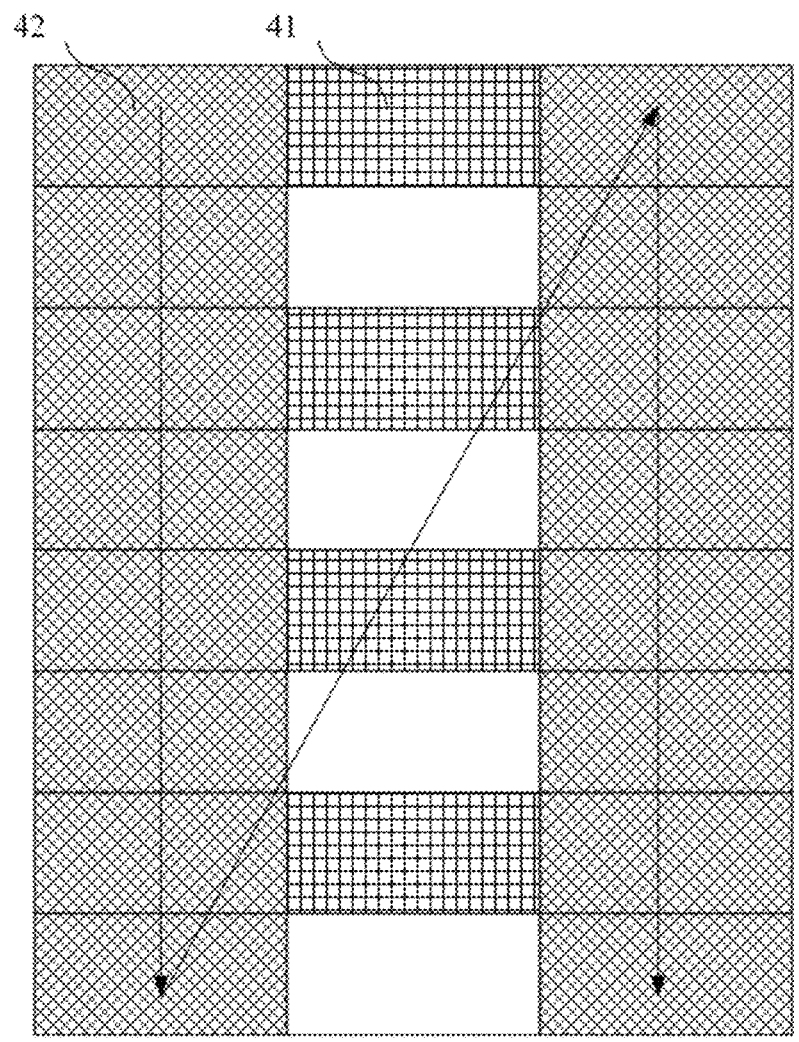
FIG. 4 schematically illustrates a diagram of a second position configuration sequence of the second stage SCI in FIG. 2.

Referring to the FIG. 4, FIG. 4 schematically illustrates a diagram of a second position configuration sequence of the second stage SCI in FIG. 2.

Specifically, the UE determines RE 41 of the DMRS symbol which is adjacent to the starting position of the second stage SCI; configures a first second stage SCI symbol on RE 42 of the starting position of the second stage SCI; on an OFDM symbol same as an OFDM symbol of the first second stage SCI symbol, configures the second stage SCI symbols sequentially according to an ascending or descending order of subcarriers of the DMRS symbol; and determines another RE which is adjacent to the RE of the DMRS symbol and has a subcarrier same as that of the RE of the DMRS symbol, and configures the second stage SCI symbols on an OFDM symbol same as an OFDM symbol of the another RE according to an ascending or descending order of subcarriers of the DMRS symbol.

It can be seen from FIG. 4 that, as shown by the arrows, the second stage SCI symbols can be sequentially configured in each vertical direction (frequency domain) until the configuration of the second stage SCI symbol is completed, or until the current two columns are filled. The remaining second stage SCI symbols may be mapped onto subsequent DMRS symbols until the configuration of the second stage SCI symbol is completed.

It should be pointed out that on a subcarrier same as that of the first second stage SCI symbol, the another RE which is adjacent to the RE of the DMRS symbol and having the same subcarrier may be determined according to the order of symbols from small to large, or may be determined according to the order of symbols from large to small.

In the embodiment of the present disclosure, by mapping the second stage SCI around the DMRS of the PSSCH, the channel estimation accuracy of the second stage SCI can be improved, which helps to improve the decoding accuracy and reduce the bit error rate.

It should be pointed out that the RE 41 may be an RE with a largest or smallest subcarrier sequence number on the DMRS symbol, or an RE with a largest or smallest subcarrier sequence number in an overlapping range between the DMRS and the time-frequency resource region of the second stage SCI, or a DMRS symbol corresponding to a subcarrier sequence number indicated through SCI or a higher layer signaling.

Continuing to refer to FIG. 1, in the specific implementation of S12, the configuration of the second stage SCI may be implemented in another way.

Figure 5:
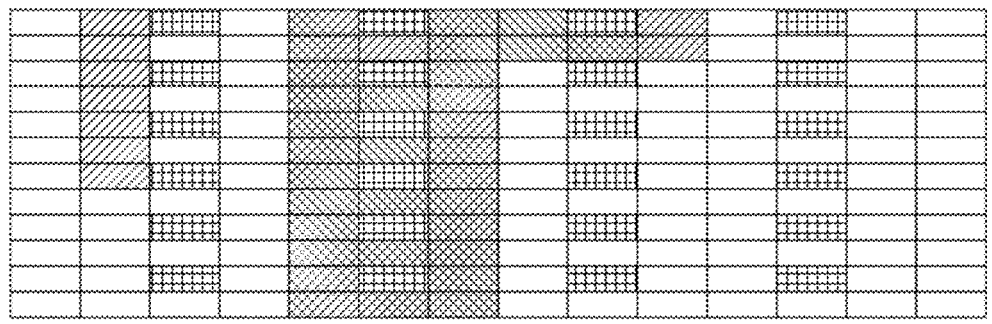
FIG. 5 schematically illustrates a diagram of a position configuration of second stage SCI according to another embodiment of the present disclosure.

Referring to FIG. 5, FIG. 5 schematically illustrates a diagram of a position configuration of second stage SCI according to another embodiment of the present disclosure.

It should be pointed out that, compared with the position shown in FIG. 2, some REs on the DMRS symbols are not used for transmitting DMRS. In the process of configuring the second stage SCI, the second stage SCI may be configured on the REs. Specifically, there are spaced subcarriers between a plurality of subcarriers of the RE of the DMRS symbol, in the process of configuring the second stage SCI, the second stage SCI may be configured on the REs of the spaced subcarriers.

Specifically, the second stage SCI may be mapped on both sides of the DMRS or on the symbol where the DMRS is located, and the mapping sequence may include mapping the second stage SCI around one DMRS symbol first, and then mapping the second stage SCI around another DMRS symbol.

Further, if the REs around a DMRS symbol are not enough to contain all the second stage SCI, the remaining second stage SCI symbols may be mapped to next DMRS symbols in turn. For example, the second stage SCI symbol may be mapped to a symbol to the left of the first DMRS symbol, then mapped to a symbol to the right of the first DMRS symbol, then mapped to a symbol to the left of the second DMRS symbol, and then mapped to a symbol to the right of the first DMRS symbol, and so on, until all second stage SCI symbols are mapped.

For another example, the second stage SCI symbol may be mapped to an RE which is not used for transmitting DMRS on the first DMRS symbol, then mapped to a symbol to the left of the first DMRS symbol, and then mapped to a symbol to the right of the first DMRS symbol, and so on, until all second stage SCI symbols are mapped.

For another example, the second stage SCI symbol may be mapped to a symbol to the left of the first DMRS symbol, then mapped to an RE which is not used for transmitting DMRS on the first DMRS symbol, and so on, until all second stage SCI symbols are mapped.

According to the embodiment of the present disclosure, by configuring the second stage SCI on the RE of the spaced subcarriers, the second stage SCI can be mapped around the DMRS of the PSSCH. Further, the spaced subcarriers which are closer to the DMRS can be fully utilized. Therefore, the channel estimation accuracy of the second stage SCI can be further improved, which helps to further improve the decoding accuracy and reduce the bit error rate.

Figure 6:
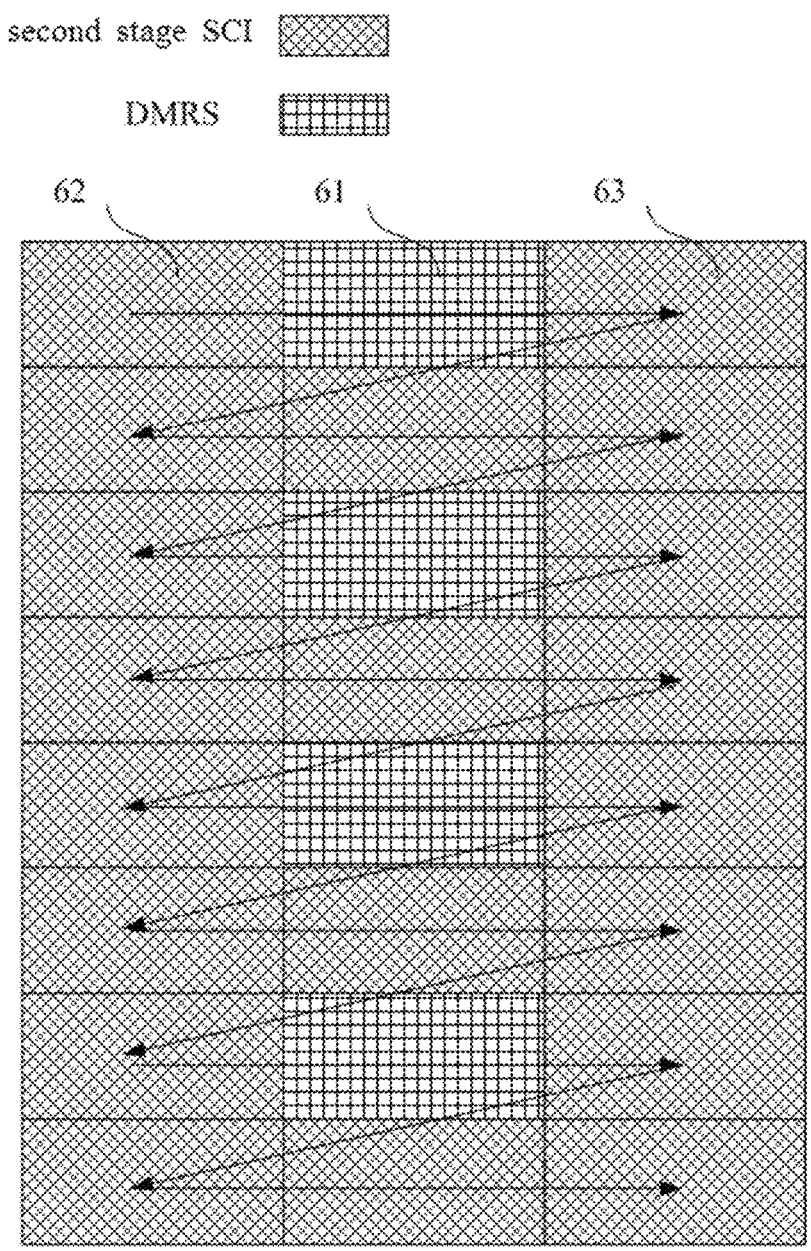
FIG. 6 schematically illustrates a diagram of a first position configuration sequence of the second stage SCI in FIG. 5.

Referring to FIG. 6, FIG. 6 schematically illustrates a diagram of a first position configuration sequence of the second stage SCI in FIG. 5.

Specifically, the UE configures the second stage SCI based on the starting position, including: determining RE 61 of the DMRS symbol which is adjacent to the starting position of the second stage SCI; configuring a first second stage SCI symbol on RE 62 of the starting position of the second stage SCI; on a subcarrier same as a subcarrier of the first second stage SCI symbol, determining another RE 63 which is adjacent to the RE of the DMRS symbol and has a subcarrier same as that of the RE of the DMRS symbol to configure a second stage SCI symbol; and configuring the second stage SCI symbols according to an ascending or descending order of subcarriers. Wherein, two second stage SCI symbols are configured sequentially on two REs which are adjacent to the RE of the DMRS symbol in response to a subcarrier to be configured having the DMRS symbol, three second stage SCI symbols are configured in response to a subcarrier to be configured having no DMRS symbol.

It can be seen from FIG. 6 that, as shown by the arrows, the second stage SCI symbols can be sequentially configured in each horizontal direction (time domain) until the configuration of the second stage SCI symbol is completed, since there is no DMRS on the spaced subcarriers, three second stage SCI symbols can be configured on the spaced subcarriers, or until the current two columns are filled. The remaining second stage SCI symbols may be mapped onto subsequent DMRS symbols until the configuration of the second stage SCI symbol is completed.

In the embodiment of the present disclosure, the second stage SCI around the DMRS of the PSSCH is mapped, the channel estimation accuracy of the second stage SCI can be improved. By configuring the second stage SCI on the RE of spaced subcarriers, spaced subcarriers which are closer to the DMRS can be fully utilized. Therefore, the channel estimation accuracy of the second stage SCI can be further improved, which is conducive to improving the decoding accuracy and reducing the bit error rate.

It should be pointed out that the RE 61 may be an RE with a largest or smallest subcarrier sequence number on the DMRS symbol, or an RE with a largest or smallest subcarrier sequence number in an overlapping range between the DMRS and the time-frequency resource region of the second stage SCI, or a DMRS symbol corresponding to a subcarrier sequence number indicated through SCI or a higher layer signaling.

Figure 7:
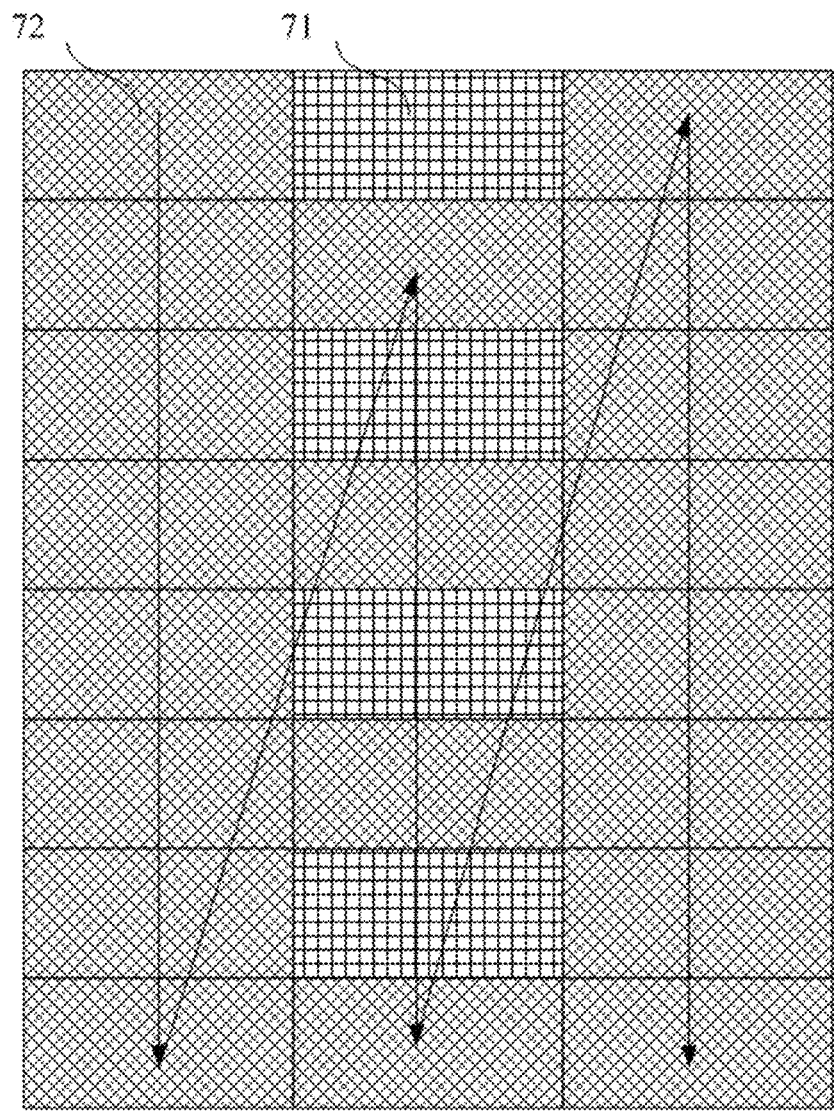
FIG. 7 schematically illustrates a diagram of a second position configuration sequence of the second stage SCI in FIG. 5.

Referring to FIG. 7, FIG. 7 schematically illustrates a diagram of a second position configuration sequence of the second stage SCI in FIG. 5.

Specifically, the UE configures the second stage SCI based on the starting position, including: determining RE 71 of the DMRS symbol which is adjacent to the starting position of the second stage SCI; configuring a first second stage SCI symbol on RE 72 of the starting position of the second stage SCI; on an OFDM symbol same as the OFDM symbol of the first second stage SCI symbol, configuring the second stage SCI symbols sequentially according to an ascending or descending order of subcarriers of the DMRS symbol; on an OFDM symbol same as that of the DMRS symbol, configuring the second stage SCI symbols on REs of spaced subcarriers sequentially according to an ascending or descending order of subcarriers; and determining another RE which is adjacent to the RE of the DMRS symbol and has a subcarrier same as that of the RE of the DMRS symbol, and configuring the second stage SCI symbols on an OFDM symbol same as that of the another RE according to an ascending or descending order of subcarriers of the DMRS symbol.

It can be seen from FIG. 7 that, as shown by the arrows, the second stage SCI symbols can be sequentially configured in each vertical direction (frequency domain) until the configuration of the second stage SCI symbol is completed, since there is no DMRS on the spaced subcarriers, the second stage SCI symbols can be configured on spaced subcarriers, or until the current two columns are filled. The remaining second stage SCI symbols may be mapped onto subsequent DMRS symbols until the configuration of the second stage SCI symbol is completed.

In the embodiment of the present disclosure, by mapping the second stage SCI around the DMRS of the PSSCH, the channel estimation accuracy of the second stage SCI can be improved. By configuring the second stage SCI on the RE of the spaced subcarriers, the spaced subcarriers which are closer to the DMRS can be fully utilized. Therefore, the channel estimation accuracy of the second stage SCI can be further improved, which helps to further improve the decoding accuracy and reduce the bit error rate.

It should be pointed out that the RE 71 may be an RE with a largest or smallest subcarrier sequence number on the DMRS symbol, or may be an RE with a largest or smallest subcarrier sequence number in an overlapping range between the DMRS and the time-frequency resource range of the second stage SCI, or may be a DMRS symbol corresponding to a subcarrier sequence number indicated through SCI or a higher layer signaling.

Figure 8:
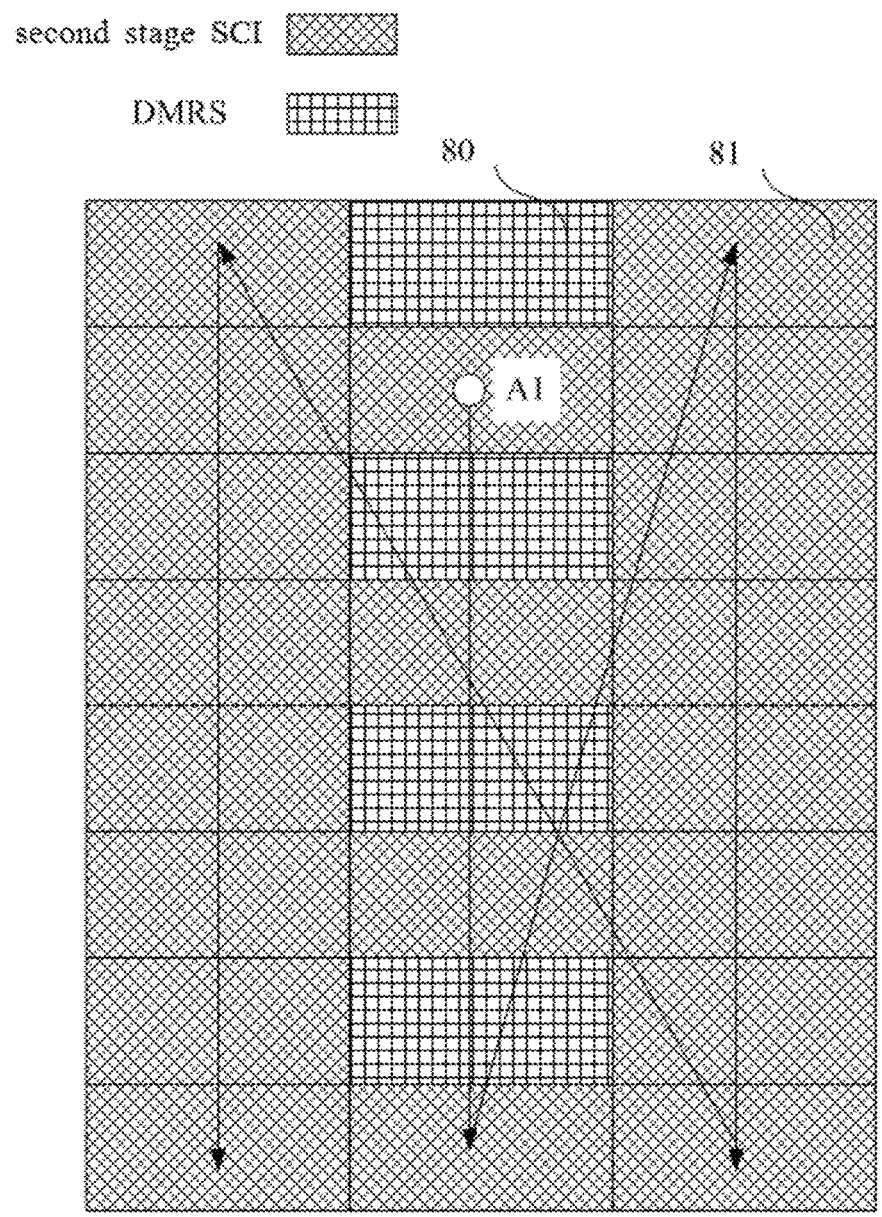
FIG. 8 schematically illustrates a diagram of a third position configuration sequence of the second stage SCI in FIG. 5.
Figure 9:
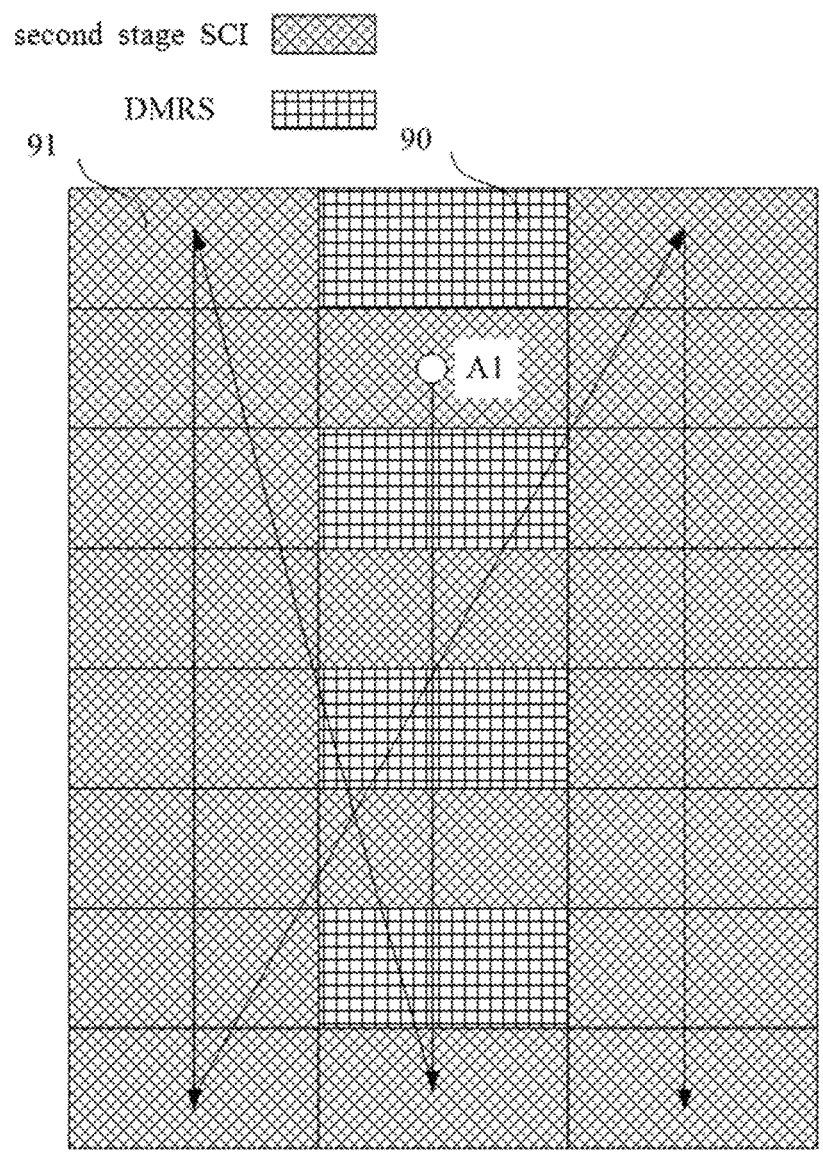
FIG. 9 schematically illustrates a diagram of a fourth position configuration sequence of the second stage SCI in FIG. 5.

Referring to FIG. 8 and FIG. 9 in conjunction, FIG. 8 schematically illustrates a diagram of a third position configuration sequence of the second stage SCI in FIG. 5; FIG. 9 schematically illustrates a diagram of a fourth position configuration sequence of the second stage SCI in FIG. 5.

Specifically, the UE configures the second stage SCI based on the position information, including: determining the RE of DMRS symbol 80 (90) which is adjacent to the starting position of the second stage SCI; on an OFDM symbol same as the OFDM symbol of the DMRS symbol, configuring second stage SCI symbols on REs of spaced subcarriers sequentially according to an ascending or descending order of subcarriers; configuring a first second stage SCI symbol on RE 81 (91) of the starting position of the second stage SCI; on an OFDM symbol same as the OFDM symbol of the starting position of the second stage SCI symbol, configuring the second stage SCI symbols sequentially according to an ascending or descending order of subcarriers of the DMRS symbol; and determining another RE which is adjacent to the RE 80 (90) of the DMRS symbol and has a subcarrier same as that of the RE 80 (90) of the DMRS symbol, and configuring the second stage SCI symbols on an OFDM symbol same as that of the another RE according to an ascending or descending order of subcarriers of the DMRS symbol.

It can be understood that the difference between the two position configurations shown in FIG. 8 and FIG. 9 lies in whether the left side is configured first or the right side is configured first. As the two position configurations shown in FIG. 8 and FIG. 9, the starting position are the same, which is A1 position.

It can be seen from FIG. 8 and FIG. 9 that, as shown by the arrows, the second stage SCI symbols can be sequentially configured in each vertical direction (frequency domain) until the configuration of the second stage SCI symbol is completed, since there is no DMRS on spaced subcarriers, the second stage SCI symbols can be configured on spaced subcarriers, or until the current two columns are filled. The remaining second stage SCI symbols may be mapped onto subsequent DMRS symbols until the configuration of the second stage SCI symbol is completed.

In the embodiment of the present disclosure, the second stage SCI around the DMRS of the PSSCH is mapped, the channel estimation accuracy of the second stage SCI can be improved. By configuring the second stage SCI on the RE of spaced subcarriers, spaced subcarriers which are closer to the DMRS can be fully utilized. Therefore, the channel estimation accuracy of the second stage SCI can be further improved, which helps to further improve the decoding accuracy and reduce the bit error rate.

It should be pointed out that RE 80 (90) may be an RE with a largest or smallest subcarrier sequence number on the DMRS symbol, or may be an RE with a largest or smallest subcarrier sequence number in an overlapping range between the DMRS and the time-frequency resource region of the second stage SCI, or may be a DMRS symbol corresponding to a subcarrier sequence number indicated through SCI or a higher layer signaling.

Figure 10:
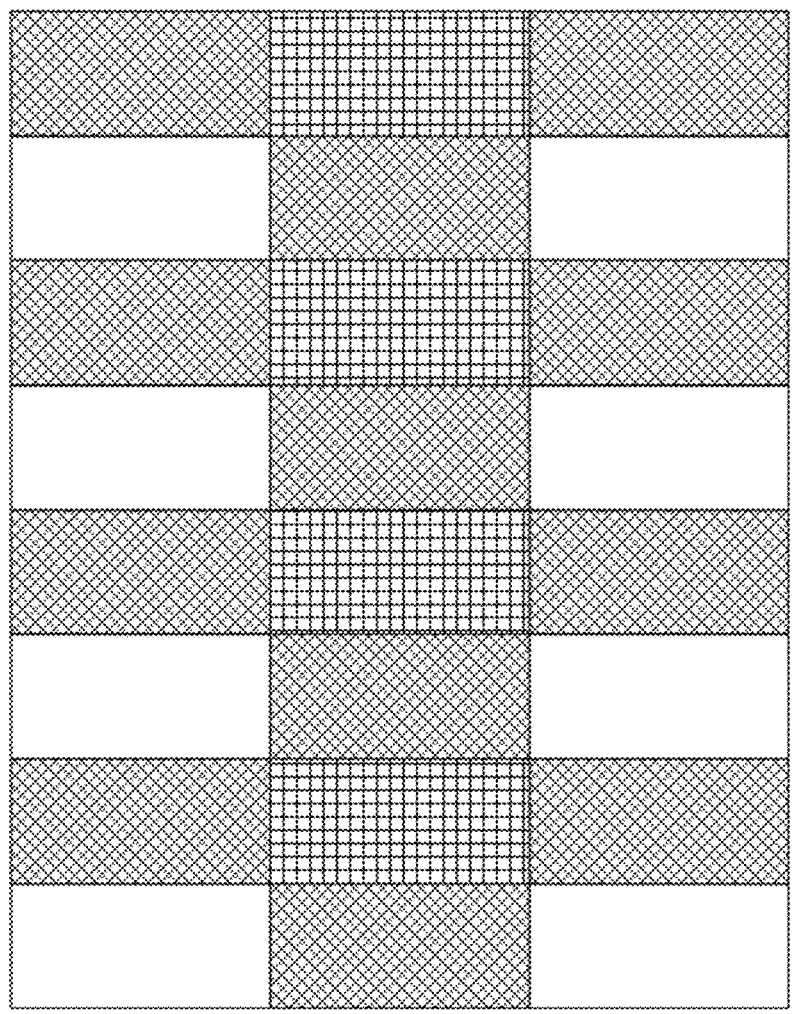
FIG. 10 schematically illustrates a diagram of a position configuration of second stage SCI according to another embodiment of the present disclosure.

Referring to FIG. 10, FIG. 10 schematically illustrates a diagram of a position configuration of second stage SCI according to another embodiment of the present disclosure.

As shown in FIG. 10, the second stage SCI is configured only on REs closest to the DMRS symbols (adjacent REs in the up, down, left, and right directions as shown in FIG. 10).

The order of the position configuration of the second stage SCI in FIG. 10 can be implemented with reference to the foregoing embodiment and the description in FIG. 2 to FIG. 9, and is not repeated here.

Continuing to refer to FIG. 1, in the specific implementation of S13, a sending UE may sends the second stage SCI to a receiving UE.

According to an embodiment of the present disclosure, by determining the position information of the time-frequency resource used for sending the second stage SCI first, and configuring the second stage SCI, the transmission and reception of the second stage SCI between the sending UE and the receiving UE can be realized.

Further, before sending the second stage SCI, the method for sending the second stage SCI further includes: sending indication information of the time-frequency resources of the second stage SCI.

Wherein, the indication information includes at least one selected from a group consisting of: a starting subcarrier of the second stage SCI, a time domain starting position of the second stage SCI.

It should be pointed out that, in this embodiment of the present disclosure, the RE is used as a smallest unit as described above. However, other units may be used to replace the RE according to specific conditions, such as an RB.

Wherein, a granularity of the starting position of the SCI time domain may be a symbol.

In a specific implementation manner of the embodiment of the present disclosure, the time-frequency resource of the second stage SCI can be indicated to the receiving UE in a direct manner.

Specifically, the indication information may further include: a frequency domain range of the second stage SCI; and a time domain range of the second stage SCI.

Wherein, the frequency domain range of the second stage SCI may be the frequency domain size of the second stage SCI, and the granularity may be an RB or an RE.

The time domain range of the second stage SCI may be the time-domain span of the second stage SCI, and the granularity is a symbol.

According to the embodiment of the present disclosure, the time-frequency resource of the second stage SCI can be indicated to the receiving UE in a direct manner, thereby improving the accuracy and comprehensiveness of the indication information.

In another specific implementation manner of the embodiment of the present disclosure, the time-frequency resource of the second stage SCI can be indicated to the receiving UE in an indirect manner.

Specifically, the position information may include a starting position of the time-frequency resource used for sending the second stage SCI, or a time domain or frequency domain position information of the time-frequency resource used for sending the second stage SCI. The position information and an index of the DMRS symbol of the PSSCH scheduled by the second stage SCI may have a preset one-to-one correspondence. The indication information may include the index used for indicating the DMRS symbol. Wherein, the UE may determine the time-frequency resource position of the second stage SCI or the starting position of the time-frequency resource of the second stage SCI according to the index indication information of the DMRS symbol.

Specifically, when the mapping rule is determined (for example, it is identified in a protocol or other appropriate predefined ways), and when a number of DMRSs in one time slot is determined, the position of the second stage SCI can be indirectly indicated by indicating the index of the DMRS symbol, so that the indication bits of the first stage SCI can be saved.

For another example, the second stage SCI may be specified in a predefined manner on the adjacent symbol of a DMRS symbol closest to the first stage SCI and/or on REs which are not used for transmitting DMRS on the DMRS symbol, or if the second stage SCI and the first stage SCI are in the form of Frequency-division multiplexing (FDM), the second stage SCI can be in a relatively fixed frequency domain position to the first stage SCI.

For example, the starting position of the second stage SCI presents at a position away from the first stage SCI with a frequency domain span of P numbers of RBs or REs and/or a position away from the first stage SCI with a time domain span of Q numbers of symbols or slots. Wherein, a reference point of the first stage SCI may be a largest RE or RB serial number in a control information range where the first stage SCI is located, or a smallest RE or RB serial number in a control information range where the first stage SCI is located, or a largest symbol or slot serial number in a control information range where the first stage SCI is located, or a smallest symbol or slot serial number in a control information range where the first stage SCI is located, or the largest RE or RB serial number in a control information range where the first stage SCI is located and the largest symbol or slot serial number in a control information range where the first stage SCI is located, or the largest RE or RB serial number in a control information range where the first stage SCI is located and the smallest symbol or slot serial number in a control information range where the first stage SCI is located, or the smallest RE or RB serial number in a control information range where the first stage SCI is located and the largest symbol or slot serial number in a control information range where the first stage SCI is located, or the smallest RE or RB serial number in a control information range where the first stage SCI is located and the smallest symbol or slot serial number in a control information range where the first stage SCI is located.

For another example, second stage SCI may be specified to present on an adjacent symbol of the N-th DMRS symbol of the PSSCH and/or on the REs which are not used for transmitting DMRS on the N-th DMRS symbol of the PSSCH. Wherein, N may be 1, 2, 3 or other positive integers; and N may be configured by a high layer signaling (such as a RRC) or indicated by a dynamic signaling (such as DCI or SCI), or be determined in a predefined manner.

For another example, the second stage SCI can be specified in a predefined manner to start from an adjacent symbol of the N-th DMRS symbol of the PSSCH or from an RE which is not used for transmitting DMRS on the N-th DMRS symbol of the PSSCH. Wherein, N may be 1, 2, 3 or other positive integers; and N may be configured by a high layer signaling (such as a RRC) or indicated by a dynamic signaling (such as DCI or SCI), or determined in a predefined manner.

For another example, the second stage SCI may be specified in a predefined manner to present on an adjacent symbol of the M-th DMRS symbol closest to the first stage SCI and/or on REs which are not used for transmitting DMRS on the M-th DMRS symbol closest to the first stage SCI. Wherein, M may be 1, 2, 3 or other positive integers; and M may be configured by a high layer signaling (such as a RRC) or indicated by a dynamic signaling (such as DCI or SCI), or determined in a predefined manner.

For another example, the second stage SCI can be specified in a predefined manner to start from an adjacent symbol of the M-th DMRS symbol closest to the first stage SCI and/or from REs which are not used for transmitting DMRS on the M-th DMRS symbol closest to the first stage SCI. Wherein, M may be 1, 2, 3 or other positive integers; and M may be configured by a high layer signaling (such as a RRC) or indicated by a dynamic signaling (such as DCI or SCI), or determined in a predefined manner. For another example, the second stage SCI may be specified in a predefined manner to present on an adjacent symbol of the nearest PSSCH DMRS symbol after the last DMRS symbol of the first stage SCI and/or on REs which are not used for transmitting DMRS on the nearest PSSCH DMRS symbol after the last DMRS symbol of the first stage SCI. Wherein, M may be 1, 2, 3 or other positive integers; and M may be configured by a high layer signaling (such as a RRC) or indicated by a dynamic signaling (such as DCI or SCI), or be determined in a predefined manner.

For another example, the second stage SCI can be specified in a predefined manner to start from an adjacent symbol of the nearest PSSCH DMRS symbol after the last DMRS symbol of the first stage SCI and/or from REs which are not used for transmitting DMRS on the nearest PSSCH DMRS symbol after the last DMRS symbol of the first stage SCI. Wherein, M may be 1, 2, 3 or other positive integers; and M may be configured by a high layer signaling (such as a RRC) or indicated by a dynamic signaling (such as DCI or SCI), or determined in a predefined manner.

According to the embodiment of the present disclosure, the time-frequency resource of the second stage SCI can be indicated to the receiving UE in an indirect manner, thereby reducing signaling overhead.

Figure 11:
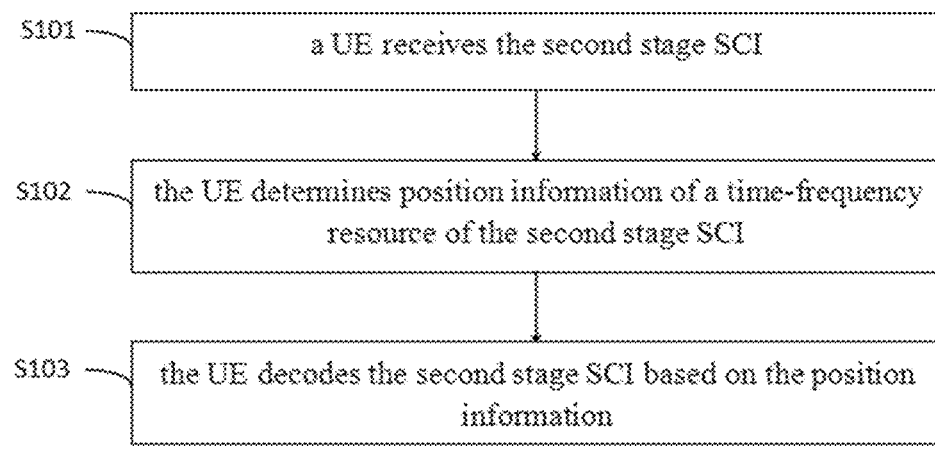
FIG. 11 schematically illustrates a flowchart of a method for receiving second stage SCI according to an embodiment of the present disclosure.

Referring to FIG. 11, FIG. 11 schematically illustrates a flowchart of a method for receiving second stage SCI according to an embodiment of the present disclosure. The method for receiving second stage SCI may include: S101, S102 and S103.

In S101, a UE receives the second stage SCI.

In S102, the UE determines position information of a time-frequency resource of the second stage SCI.

In S103, the UE decodes the second stage SCI based on the position information.

Further, the position information may include a starting position of the time-frequency resource used for sending the second stage SCI; and the UE determines the second stage SCI based on the position information, including: decoding the second stage SCI based on the starting position.

Further, an RE of the starting position of the second stage SCI and an RE of a DMRS symbol of a PSSCH scheduled by the second stage SCI are adjacent and located in a same OFDM symbol; or the RE of the starting position of the second stage SCI and the RE of the DMRS symbol of the PSSCH scheduled by the second stage SCI are adjacent and located in a same subcarrier.

Further, the UE decodes the second stage SCI based on the starting position, including: determining the RE of the DMRS symbol which is adjacent to the starting position of the second stage SCI; determining a first second stage SCI symbol on the RE of the starting position of the second stage SCI; on a subcarrier same as that of the first second stage SCI symbol, determining another RE which is adjacent to the RE of the DMRS symbol and has a subcarrier same as that of the RE of the DMRS symbol, and determining a second stage SCI symbol; determining two second stage SCI symbols sequentially on two REs which are adjacent to the REs of the DMRS symbol according to an ascending or descending order of subcarriers of the DMRS symbol; and decoding the determined second stage SCI symbol.

Further, the UE decodes the second stage SCI based on the starting position, including: determining the RE of the DMRS symbol which is adjacent to the starting position of the second stage SCI; determining a first second stage SCI symbol on the RE of the starting position of the second stage SCI; on an OFDM symbol same as the OFDM symbol of the first second stage SCI symbol, determining the second stage SCI symbols sequentially according to an ascending or descending order of subcarriers of the DMRS symbol; determining another RE which is adjacent to the RE of the DMRS symbol and has a subcarrier same as that of the RE of the DMRS symbol, and determining the second stage SCI symbols on an OFDM symbol same as that of the another RE according to an ascending or descending order of subcarriers of the DMRS symbol; and decoding the determined second stage SCI symbol.

Further, there are spaced subcarriers between a plurality of subcarriers of the RE of the DMRS symbol. The UE determines the second stage SCI based on the starting position, including: determining the RE of the DMRS symbol which is adjacent to the starting position of the second stage SCI; determining a first second stage SCI symbol on the RE of the starting position of the second stage SCI; on a subcarrier same as the subcarrier of the first second stage SCI symbol, determining another RE which is adjacent to the RE of the DMRS symbol and has a subcarrier same as that of the RE of the DMRS symbol, and determining a second stage SCI symbol; determining the second stage SCI symbols according to an ascending or descending order of subcarriers, wherein two second stage SCI symbols are determined sequentially on two REs which are adjacent to the RE of the DMRS symbol in response to a subcarrier to be determined having the DMRS symbol, and three second stage SCI symbols are determined in response to a subcarrier to be determined having no DMRS symbol; and decoding the determined second stage SCI symbol.

Further, there are spaced subcarriers between a plurality of subcarriers of the RE of the DMRS symbol. The UE determines the second stage SCI based on the starting position, including: determining the RE of the DMRS symbol which is adjacent to the starting position of the second stage SCI; determining a first second stage SCI symbol on the RE of the starting position of the second stage SCI; on an OFDM symbol same as that of the first second stage SCI symbol, determining the second stage SCI symbols sequentially according to an ascending or descending order of subcarriers of the DMRS symbol; on an OFDM symbol same as that of the DMRS symbol, determining the second stage SCI symbols on REs of the spaced subcarriers sequentially according to an ascending or descending order of subcarriers; determining another RE which is adjacent to the RE of the DMRS symbol and has a subcarrier same as that of the RE of the DMRS symbol, and on an OFDM symbol same as the OFDM symbol of the another RE, determining the second stage SCI symbols according to an ascending or descending order of subcarriers of the DMRS symbol; and decoding the determined second stage SCI symbol.

Further, there are spaced subcarriers between a plurality of subcarriers of the RE of the DMRS symbol. The UE determines the second stage SCI based on the position information, including: determining the RE of the DMRS symbol which is adjacent to the starting position of the second stage SCI; on an OFDM symbol same as that of the DMRS symbol, determining the second stage SCI symbols on REs of the spaced subcarriers sequentially according to an ascending or descending order of subcarriers; determining a first second stage SCI symbol on a RE of the starting position of the second stage SCI; on an OFDM symbol same as the OFDM symbol of the starting position of the second stage SCI symbol, determining the second stage SCI symbols sequentially according to an ascending or descending order of subcarriers of the DMRS symbol; determining another RE which is adjacent to the RE of the DMRS symbol and has a subcarrier same as that of the RE of the DMRS symbol, and determining the second stage SCI symbols on an OFDM symbol same as the OFDM symbol of the another RE according to an ascending or descending order of subcarriers of the DMRS symbol; and decoding the determined second stage SCI symbol.

Further, the position information includes all time-frequency resources used for sending the second stage SCI. The UE decodes the second stage SCI based on the position information, including: determining an initial position from the all time-frequency resources used for sending the second stage SCI; and decoding the second stage SCI based on the initial position.

Further, the UE determines the starting position of a time-frequency resource of the second stage SCI, including: receiving indication information of the time-frequency resources of the second stage SCI.

Further, the indication information includes at least one selected from a group consisting of: a starting subcarrier of the second stage SCI, a time domain starting position of the second stage SCI; the indication information further includes: a frequency domain range of the second stage SCI; and a time domain range of the second stage SCI.

Further, the position information includes a starting position of the time-frequency resource used for sending the second stage SCI; the starting position of the time-frequency resource of the second stage SCI and an index of the DMRS symbol of the PSSCH scheduled by the second stage SCI have a preset one-to-one correspondence; and the indication information includes the index for indicating the DMRS symbol.

In the specific implementation, for more details about S101 to S103, please refer to the descriptions of S11 to S13 in FIG. 1 for execution, which is not be repeated here.

Figure 12:
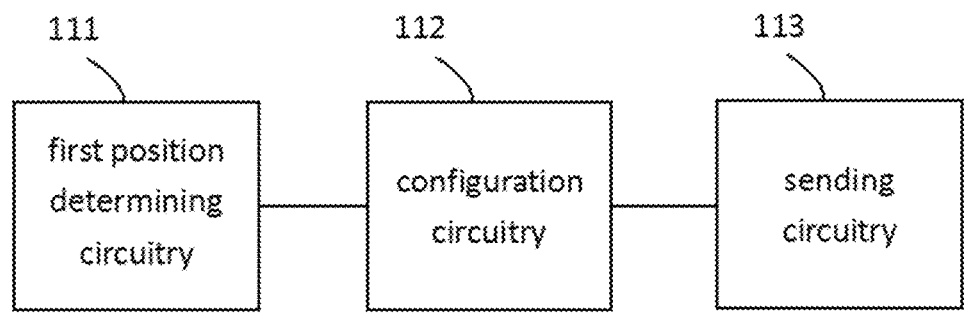
FIG. 12 schematically illustrates a structural diagram of a device for sending second stage SCI according to an embodiment of the present disclosure.

Referring to FIG. 12, FIG. 12 schematically illustrates a structural diagram of a device for sending second stage SCI according to an embodiment of the present disclosure. The device may include: a first position determining circuitry 111, a configuration circuitry 112 and a sending circuitry 113.

The first position determining circuitry 111 is adapted to determine position information of a time-frequency resource used for sending the second stage SCI.

The configuration circuitry 112 is adapted to configure the second stage SCI based on the position information.

The sending circuitry 113 is adapted to send the second stage SCI.

For more details about the working principles and working modes of the device for sending second stage SCI, reference may be made to the relevant descriptions in FIG. 1, which is not repeated here.

Figure 13:
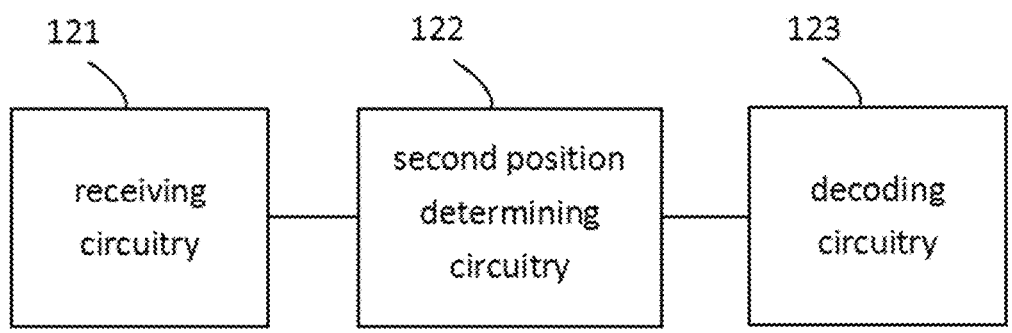
FIG. 13 schematically illustrates a structural diagram of a device for receiving second stage SCI according to an embodiment of the present disclosure.

Referring to FIG. 13, FIG. 13 schematically illustrates a structural diagram of a device for receiving second stage SCI according to an embodiment of the present disclosure. The device may include: a receiving circuitry 121, a second position determining circuitry 122 and a decoding circuitry 123.

The receiving circuitry 121 is adapted to receive the second stage SCI.

The second position determining circuitry 122 is adapted to determine position information of a time-frequency resource of the second stage SCI.

The decoding circuitry 123 is adapted to decode the second stage SCI based on the position information.

For more details about the working principles and working modes of the device for receiving second stage SCI, reference may be made to the relevant descriptions in FIG. 11, which will not be repeated here.

In an embodiment of the present disclosure, a storage medium having computer instructions stored therein is provided, wherein once the computer instructions are executed, the method shown in above embodiments can be performed. The storage medium includes a computer-readable storage medium, such as a non-volatile memory or a non-transitory memory. The storage medium may also include an optical disk, a mechanical hard disk, a solid state hard disk, or the like.

In an embodiment of the present disclosure, a sending UE including a memory and a processor is provided, wherein the memory has computer instructions stored therein, and the method shown in above embodiments can be performed, once the processor executes the computer instructions. The sending UE may includes, but is not limited to, a terminal equipment such as a vehicle-mounted control system, a mobile phone, a computer, and a tablet computer.

In an embodiment of the present disclosure, a receiving UE including a memory and a processor is provided, wherein the memory has computer instructions stored therein, and the method shown in above embodiments can be performed, once the processor executes the computer instructions. The receiving UE may includes, but is not limited to, a terminal equipment such as a vehicle-mounted control system, a mobile phone, a computer, and a tablet computer.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for sending second stage Sidelink Control Information (SCI), comprising:
    determining a first Demodulation Reference Signal (DMRS) symbol of a Physical Sidelink Shared Channel (PSSCH);
    configuring symbols of the second stage SCI based on the first DMRS symbol in an ascending or descending order of subcarriers of the first DMRS symbol, wherein Resource Elements (REs) of the symbols of the second stage SCI are not used for transmitting DMRS symbols; and
    sending the second stage SCI;
    wherein the method further comprises:
        determining position information of a time-frequency resource used for sending the second stage SCI, and configuring the second stage SCI based on the position information, the first DMRS symbol and the subcarriers, wherein the position information comprises a starting position of the time-frequency resource used for sending the second stage SCI;
    wherein an RE of the starting position of the second stage SCI and an RE of a DMRS symbol of the PSSCH scheduled by the second stage SCI are adjacent and located in a same Orthogonal Frequency Division Multiplexing (OFDM) symbol; or the RE of the starting position of the second stage SCI and the RE of the DMRS symbol of the PSSCH scheduled by the second stage SCI are adjacent and located in a same subcarrier;
    wherein said configuring the second stage SCI comprises:
        determining the RE of the DMRS symbol which is adjacent to the starting position of the second stage SCI;
        configuring a first second stage SCI symbol on the RE of the starting position of the second stage SCI;
        on a subcarrier same as a subcarrier of the first second stage SCI symbol, determining another RE which is adjacent to the RE of the DMRS symbol and has a subcarrier same as a subcarrier of the RE of the DMRS symbol, and configuring a second second stage SCI symbol; and
        configuring two second stage SCI symbols sequentially on two REs which are adjacent to the REs of the DMRS symbol according to an ascending or descending order of subcarriers of the DMRS symbol.

2. The method according to claim 1, wherein before sending the second stage SCI, the method further comprises:
    sending indication information of time-frequency resources of the second stage SCI.

3. A method for receiving second stage Sidelink Control Information (SCI), comprising:
    receiving the second stage SCI;
    determining symbols of the second stage SCI based on a first Demodulation Reference Signal (DMRS) symbol of a Physical Sidelink Shared Channel (PSSCH) in an ascending or descending order of subcarriers of the first DMRS symbol, wherein Resource Elements (REs) of the symbols of the second stage SCI are not used for transmitting DMRS symbols; and
    decoding the second stage SCI;
    wherein the method further comprises:
        determining position information of a time-frequency resource of the second stage SCI and decoding the second stage SCI based on the position information, the first DMRS symbol and the subcarriers, wherein the position information comprises a starting position of the time -frequency resource used for sending the second stage SCI;
    wherein an RE of the starting position of the second stage SCI and an RE of a DMRS symbol of the PSSCH scheduled by the second stage SCI are adjacent and located in a same Orthogonal Frequency Division Multiplexing (OFDM) symbol; or the RE of the starting position of the second stage SCI and the RE of the DMRS symbol of the PSSCH scheduled by the second stage SCI are adjacent and located in a same subcarrier;
    wherein said decoding the second stage SCI comprises:
        determining the RE of the DMRS symbol which is adjacent to the starting position of the second stage SCI;
        determining a first second stage SCI symbol on the RE of the starting position of the second stage SCI;
        on a subcarrier same as a subcarrier of the first second stage SCI symbol, determining another RE which is adjacent to the RE of the DMRS symbol and has a subcarrier same as a subcarrier of the RE of the DMRS symbol and determining a second second stage SCI symbol;
        determining two second stage SCI symbols sequentially on two REs which are adjacent to the REs of the DMRS symbol according to an ascending or descending order of subcarriers of the DMRS symbol; and decoding the determined second stage SCI symbol.

4. A device for sending second stage Sidelink Control Information (SCI), comprising a memory and a processor, wherein the memory stores one or more programs, the one or more programs comprising computer instructions, which, when executed by the processor, cause the processor to:

determine a first Demodulation Reference Signal (DMRS) symbol of a Physical Sidelink Shared Channel (PSSCH);

configure symbols of the second stage SCI based on the first DMRS symbol in an ascending or descending order of subcarriers of the first DMRS symbol, wherein Resource Elements (REs) of the symbols of the second stage SCI are not used for transmitting DMRS symbols; and send the second stage SCI;

wherein the processor is further caused to:

determine position information of a time-frequency resource used for sending the second stage SCI, and configure the second stage SCI based on the position information, the first DMRS symbol and the subcarriers, wherein the position information comprises a starting position of the time-frequency resource used for sending the second stage SCI;

wherein an RE of the starting position of the second stage SCI and an RE of a DMRS symbol of the PSSCH scheduled by the second stage SCI are adjacent and located in a same Orthogonal Frequency Division Multiplexing (OFDM) symbol; or the RE of the starting position of the second stage SCI and the RE of the DMRS symbol of the PSSCH scheduled by the second stage SCI are adjacent and located in a same subcarrier;

wherein said configuring the second stage SCI comprises:

determining the RE of the DMRS symbol which is adjacent to the starting position of the second stage SCI;

configuring a first second stage SCI symbol on the RE of the starting position of the second stage SCI;

on a subcarrier same as a subcarrier of the first second stage SCI symbol, determining another RE which is adjacent to the RE of the DMRS symbol and has a subcarrier same as a subcarrier of the RE of the DMRS symbol, and configuring a second second stage SCI symbol; and configuring two second stage SCI symbols sequentially on two REs which are adjacent to the REs of the DMRS symbol according to an ascending or descending order of subcarriers of the DMRS symbol.

* * * * *